Sept. 21, 1971  A. M. KING  3,606,961
VENDING MACHINE SELECTION AND CONTROL
Filed Sept. 10, 1969  2 Sheets-Sheet 1
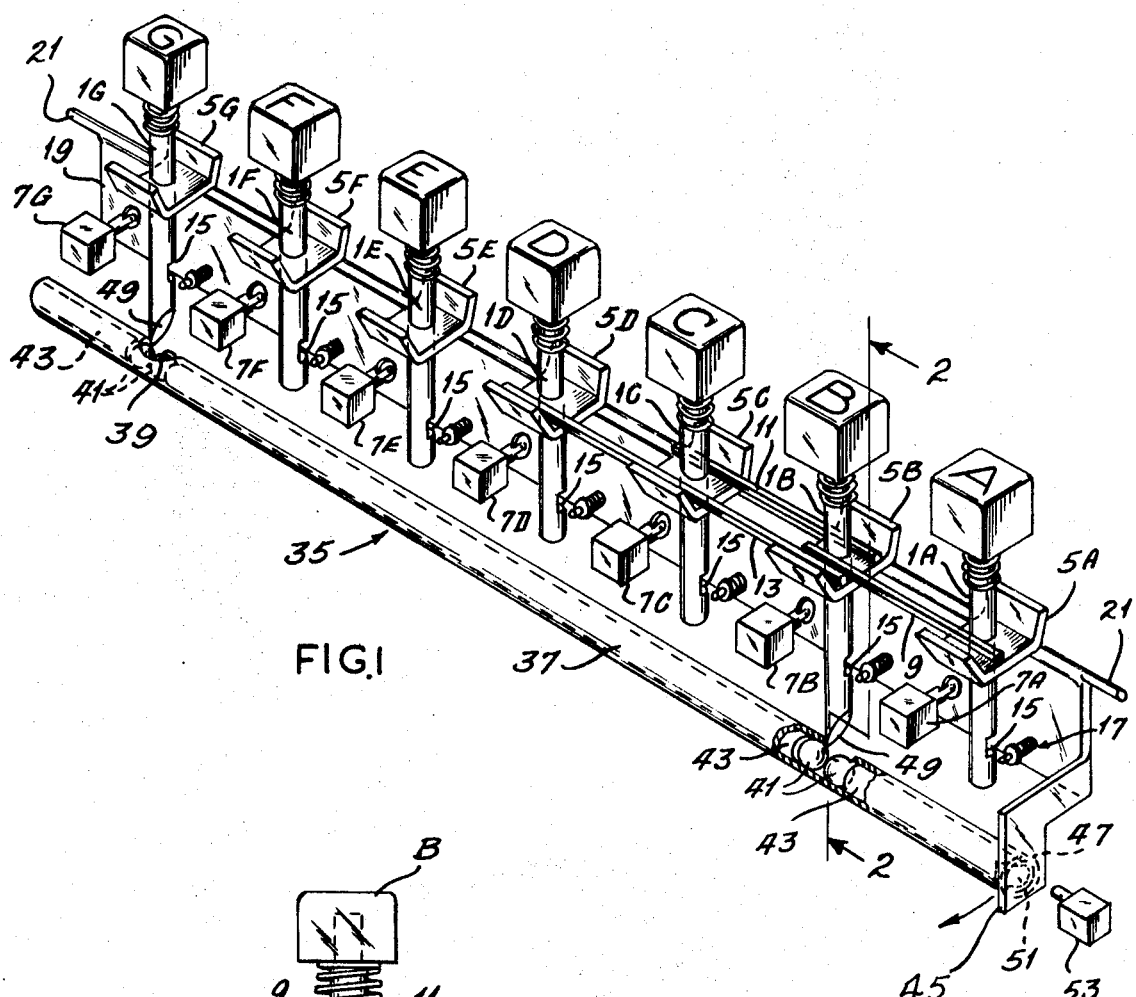
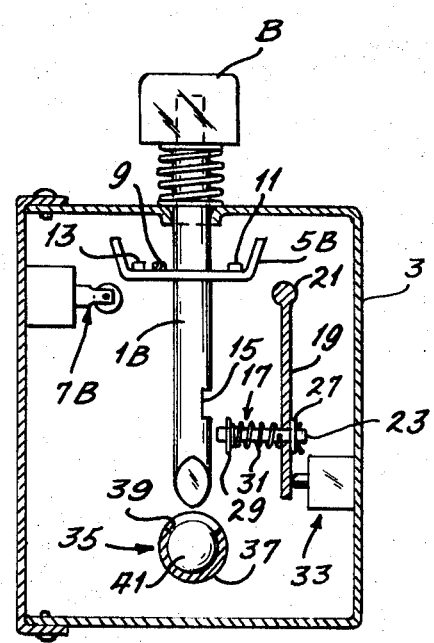
INVENTOR:
ALAN M. KING
BY Gravely, Lieder & Woodruff
ATTORNEYS.

INVENTOR:
ALAN M. KING
BY Gravely, Lieder & Woodruff
ATTORNEYS.

United States Patent Office 3,606,961
Patented Sept. 21, 1971

3,606,961
VENDING MACHINE SELECTION AND CONTROL
Alan M. King, 4746 The Boulevard,
Westmount, Quebec, Canada
Filed Sept. 10, 1969, Ser. No. 856,585
Int. Cl. B67d 5/06
U.S. Cl. 222—76                                  13 Claims

ABSTRACT OF THE DISCLOSURE

A selection and control mechanism for a vending machine in which a primary liquid is dispensed as well as various additives selected by the customer. The mechanism includes a primary selector which is normally blocked from shifting by a release device controlled by a latching device. When the latching device moves to its latching position, it also moves the release device such that the selector can be depressed, and it further holds the selector in its depressed position. As the selector moves to its depressed position, it actuates a primary switch. Secondary selectors are also provided and they operate secondary switches when depressed. The latching means also holds the secondary selectors in their depressed positions. The primary selector can be depressed independently of the secondary selectors. Each secondary selector when depressed carries the primary selector along with it and may, likewise, carry another secondary selector along with it.

BACKGROUND OF THE INVENTION

This invention relates to a selection and control mechanism and, more particularly, to a selection and control mechanism for vending machines.

The selection and control mechanism for operating beverage vending machines are necessarily complex since most beverage vending machines are designed to offer the customer not only a choice of hot beverages but, in the case of coffee, a choice of what is added to the coffee. The customer may choose black coffee, coffee with sugar only, coffee with cream only, coffee with both cream and sugar, and coffee with extra cream or extra sugar. The selection and control mechanism used to operate the machine to provide the desired beverage has comprised an arrangement of electrical switches which because of the numerous choices and combination of choices available is quite complex, cumbersome, and because of its complexity, more liable to malfunction.

SUMMARY OF THE INVENTION

Applicant's invention is directed toward a new selection and control mechanism which is more compact, reliable in operation and simple in construction. The improved mechanism replaces a major portion of the electrical selection switches previously used with a mechanical selection device.

DESCRIPTION OF THE DRAWINGS

The invention will now be described in detail having reference to the accompanying drawings, in which:

FIG. 1 is a schematic view of the selection mechanism in a coffee vending machine;

FIG. 2 is a cross-sectional view taken along line 2—2 in FIG. 1 illustrating further details of the selection mechanism.

DETAILED DESCRIPTION OF THE INVENTION

Figure 3:
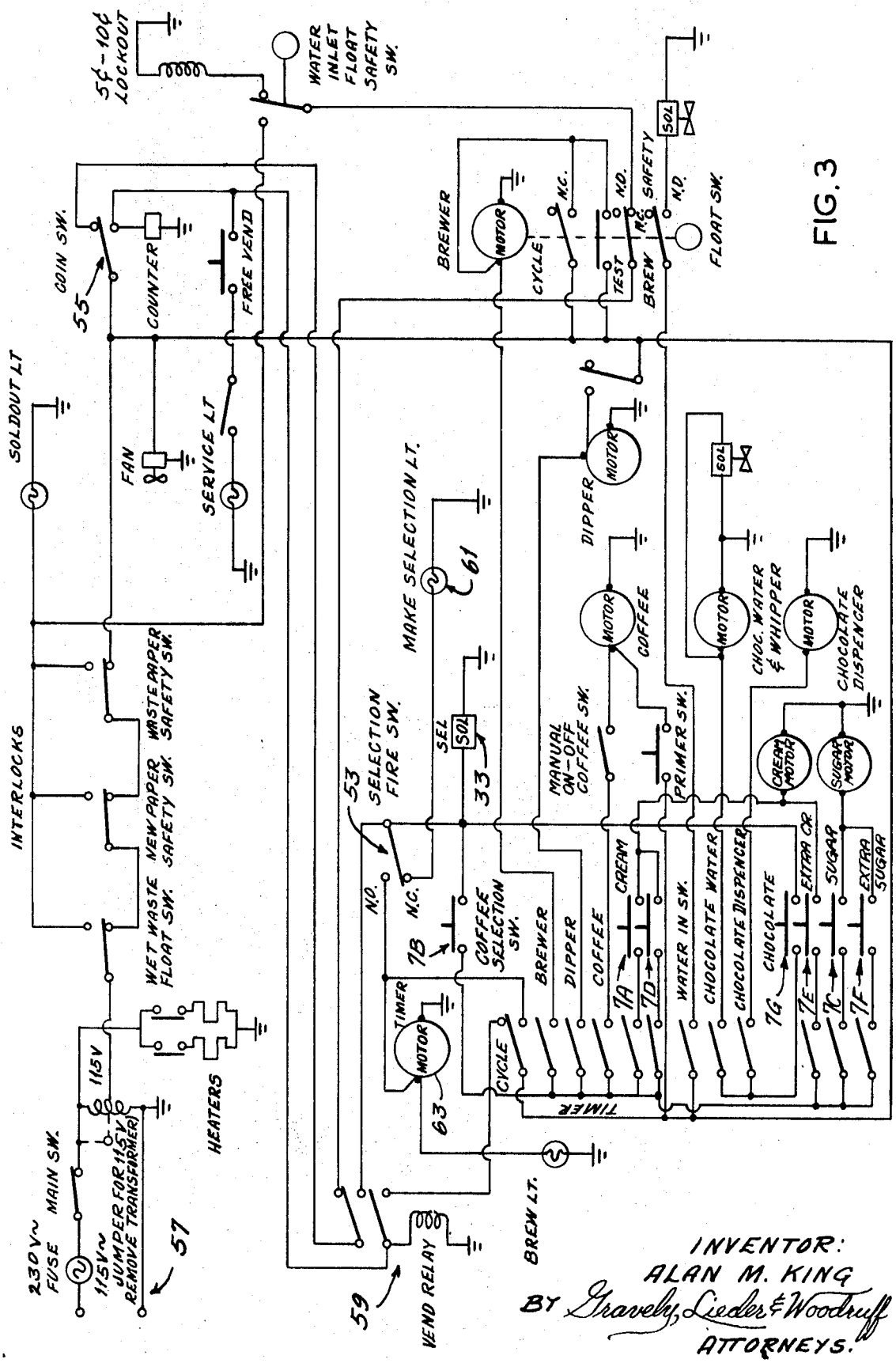
FIG. 3 is a circuit diagram showing the incorporation of the novel selection mechanism in conjunction with the operational circuitry of a vending machine.

As shown in FIG. 1, the coffee vending machine selection and control mechanism includes in the particular example described, a series of seven selection buttons which are located on the face of the vending machine to be operated by the person depending on the choice of beverage he desires. The seven buttons, labelled A, B, C, D, E, F, G provide the following type of beverage:

(A) Coffee with cream
(B) Black coffee
(C) Coffee with sugar
(D) Coffee with cream and sugar
(E) Coffee with extra sugar
(F) Coffee with extra cream
(G) Chocolate These buttons A–G are connected to selector rods 1A–1G, to form selector means. The rods 1A–1G are guided for reciprocating movement within a casing 3 as shown in FIG. 2 and can be spring loaded to return them to their original position when depressed. The casing 3 is set in the face of the vending machine.

Each selector rod 1A–1G has a cam member 5A–5G attached to it. Attached within the casing is a series of simple roller type switches 7A–7G, each switch positioned to be operated by an associated cam member upon depression of the related selector rod.

To avoid the plurality of electrical switches previously required in selecting coffee so that it is either black, with cream, with sugar, or with both cream and sugar, mechanical links are provided between buttons A, B, C and D. As shown in FIG. 1, for example, a connector bar 9 is attached to cam member 5A on the selector rod 1A for coffee with cream. The bar 9 extends to rest on top of the cam member 5B on the operating rod 1B for black coffee. Depression of button A will cause the connector bar 9 to move downwardly thus also depressing button B. Both switches 7A and 7B will then be actuated by their respective cam members 5A and 5B to provide coffee plus cream. A second connector bar 11 attached to cam member 5C extends to rest on cam member 5B. Depression of button C will cause the connector bar 11 to depress the black coffee button B and thus simultaneously actuate both the black coffee switch 7B and the sugar switch 7C to provide coffee plus sugar. A third connector bar 13 is attached to cam member 5D and extends over the sugar cam 5C. Depression of button D will actuate switches 7D, 7C and 7B to provide coffee plus sugar plus cream. If black coffee only is desired, the customer presses button B thus actuating switch 7B only. Buttons A, C and D are not actuated since the connector bars 9, 11 and 13 are not attached to cam member 5B.

Buttons E and F are not mechanically connected to buttons A, B, C or D. However, they are connected electrically so that they operate only when black coffee button B is depressed either directly or indirectly through connector bars 9, 11 or 13. Their operation controls circuitry through switches 7E or 7F to add an extra amount of cream or an extra amount of sugar as desired to the coffee.

Button G when depressed operates a switch 7G to provide hot chocolate.

Thus, the buttons B and G and their corresponding rods 1B and 1G, respectively, may be considered primary selectors, while the buttons A, C and D and their rods 1A, 1C and 1D may be considered secondary selectors.

Means are provided to latch any of the buttons A–G actuated in an operative position until the vending cycle is completed. Each selector rod 1A–1G has a notch 15 located on its surface with which a latch pin 17 cooperates when the selector rod is depressed to lock it in an operative position. The latch pins 17 are mounted on a swinging latch plate 19 which is movable from an at rest or nonlatching position where the pins 17 cannot enter the notches 15 to an operative or latching position biasing the latch pins 17 against the selector rods 1A–1G so that when the rods are depressed, the notches 15 are aligned with the latch pins 17, causing each pin 17 to snap into its notch 15 to hold the corresponding selector rod in a depressed position. The latch plate 19 has a pivot mounting 21 at one edge connecting it to the casing 3. Each latch pin 17 comprises a pin member 23 extending loosely through a hole 25 in the latch plate 19. A locking pin 27 passes through one end of pin member 23 to prevent it from passing through the hole 25. A collar 29 is fixed adjacent the other end. A spring 31 is located between the collar and latch plate 19 to bias the pin member 23 outwardly. When the latch plate 19 is moved toward the selector rods 1B–1G, the pin member 23 abuts the selector rod 5 below the notch 15 and then moves against the force of the spring 31. When the selector rod 5 is depressed, the spring 31 causes the pin member 23 to snap into the notch 15. The latch plate 19 can be pivotally moved to the operative or latching position by a solenoid mechanism 33.

Means are provided in the mechanism to prevent actutation of chocolate button G if coffee button B is depressed and vice versa. This lock-out and release means is necessary to prevent simultaneous operation of both the chocolate and coffee vending mechanisms. The lock-out and release means 35 comprises the known spreader rod mechanism. This mechanism includes a tube 37 having two holes 39 located adjacent the bottom of the selector rods 1B and 1G for the coffee and the chocolate buttons respectively. Two adjacent balls 41 are located within the tube adjacent each hole 39. Spacer bars 43 are located between the pairs of balls 41 to prevent their movement in the tube 37 when in an operative position. A restraining member 45 on the latch plate 19 covers one open end 47 of the tube 37 to maintain the bars 43 and the balls 41 in closely spaced position to prevent their movement. The other end 49 of the tube 37 is closed. With the member 45 moved away from the end 47 through movement of the latch plate 19, a tapered end 49 of either the coffee or the chocolate selector rod, depending on which is depressed, can move through its associated hole 39 between the balls 41 to cause a tapered end 51 of the bar 43 adjacent the open end 47 of the tube 37 to move out of the tube. Both ends 49 of the selector rods 1B, 1G cannot be inserted at the same time since the balls 41 and bars 43 are arranged to move a distance permitting insertion of only one rod end 49. This mechanism effectively locks out the other rod end 49 rendering the button associated with it inoperative. The amount of movement of the balls 41 and bars 43 is limited by tapered end 51 of the outer bar abutting and actuating a selection fire switch 53. At the end of the vending operation, the latch plate 19, moving back to an inoperative position, through a spring return or other means, unlatches the selector rod 1B or 1G and simultaneously, through the restraining member 45, cams the balls 41 and bars 43 back together within the tube 37.

The operation of the vending machine with the improved selector and control mechanism will be described now having reference to both FIGS. 1 and 2 and to FIG. 3 showing the electrical circuit of the vending machine.

The machine is operated by inserting a coin in the machine. This operates the coin switch 55 to close a circuit from power supply 57 and close the vend relay 59 to ready the machine for operation. Simultaneously, this causes operation of selection solenoid 33 which moves the latch plate 19 toward the selector rods 1A–1G thus causing the restraining member 45 to unblock the end of the tube 37 and also moving the latch pins 17 against selector rods 1A–1G. A selection light 61 is turned on indicating to the customer that he may now press buttons A to G to obtain the desired beverage. Assuming that the customer desires coffee with cream, he presses button A. This causes both button A and button B to be depressed through the connector bar 9. Depression of both buttons operates both associated switches 7A and 7B through cams 5A and 5B. The selector rods 1A and 1B are latched in place through latch pins 17 to maintain switches 7A and 7B closed. The lower end 49 of selector rod 1B passes through hole 39 spreading apart the balls 41, thus locking out the chocolate button G and causing operation of selection fire switch 53. This operates the timer motor 63 to start the operation of the various parts of the vending machine necessary to brew a cup of coffee and to add cream to the coffee. The actual brewing of the coffee and the mechanism involved can take various well-known forms and do not form a part of this invention. The mechanism for brewing the coffee may also take the form disclosed in U.S. Pat. 3,354,811 or U.S. Pat. 3,552,976. Upon completion of the coffee brewing and dispensing cycles, the selection solenoid 33 is de-energized causing removal of the latch pins 17 from the slots 15, allowing the selector rods to return to their upper rest position and moving the restraining member 45 back in place to close off the tube 37 so as to move the bars 43 and balls 41 together. The machine is then ready for another customer.

If no coin is inserted in the machine, the spreader bar mechanism is not unlocked and neither the coffee button B or the chocolate button G cannot be depressed or operated since they cannot move down between the balls 41. The other buttons may be depressed but nothing will happen since the selection fire switch 53 cannot be operated. The other buttons will not be latched down either since the latch plate 19 is not in position to have the latch pins 17 move into the slots 15.

Means can be provided for electrically locking out buttons C and D once button A and, indirectly, button B have been depressed.

The extra cream and extra sugar buttons E and F cannot operate their mechanisms independently since they are tied in with the coffee circuit and, therefore, the coffee button B must be operated either directly or through the operation of buttons A, C or D, before actuation of buttons E and F will cause the addition of extra cream or extra sugar.

If chocolate is desired and the chocolate button G is operated, the chocolate selection switch 7G is actuated upon depression of the button G. Selection fire switch 53 is operated starting the timer motor 63 to operate the necessary mechanism to produce a cup of hot chocolate. The remaining buttons can be actuated and some even latched in, but nothing will happen since they are electrically tied in with the coffee selection button B which in itself cannot be operated since the spreader bar mechanism locks it out.

While only coffee and chocolate mechanisms have been described, other beverages such as tea or soup may be dispensed as well.

What is claimed is:

1. A selection and control mechanism comprising a primary switch, shiftable primary selector means for actuating the primary switch when shifted, release means normally blocking shifting movement of the selector means but being moveable to a position in which it permits movement of the primary selector means to its switch actuating position, a secondary switch, shiftable secondary selector means for actuating the secondary switch, and latching means connected to the release means and moveable from a non-latching position to a latching position as the release means moves from its blocking position to the position in which it permits shifting movement of the primary selector means, the latching means when in its latching position holding each selector means in its switch actuating position upon shifting movement of that selector means to its switch actuating position.

2. A mechanism according to claim 1 and further characterized by connector means connected with the secondary selector means for shifting the primary selector means to its switch actuating position when the secondary selector means is shifted to its switch actuating position, the secondary selector means not being operated when the primary selector means is shifted.

3. A mechanism according to claim 2 and further characterized by an additional secondary switch, an additional secondary selector means, and an additional connector means connected with the additional selector means for shifting both the other secondary selector means and the primary selector means to their switch actuating positions when the additional secondary selector means is shifted to its switch actuating position, the additional selector means not being operated when the other selector means or the primary selector means is shifted.

4. A mechanism according to claim 2 wherein the primary selector means includes an axially shiftable rod and a laterally projecting abutment on the rod; and wherein the secondary selector means includes an axially shiftable rod and a bar fastened to the rod and projecting across the abutment on the rod of the primary selector means; whereby both the primary and secondary selector rods will shift when the secondary selector rod is moved, but only the primary selector rod will shift when the primary rod is moved.

5. A mechanism according to claim 1 wherein the primary selector means includes a rod which shifts axially when the primary selector means is moved to its switch actuating position; and wheren the release means comprises a tube having an aperture for receiving the rod when the primary selector means is moved to its switch actuating position, an element shiftable within the tube from a position wherein it blocks the aperture and prevents entry of the rod into the tube, and a blocking member for preventing movement of the element beyond the position wherein it blocks the aperture, the blocking member being connected with the latching means and allowing movement of the element beyond the aperture when the latching means moves to its latching position whereby the rod of the primary selector means can enter the aperture when the latching means moves to its latching position.

6. A mechanism according to claim 1 wherein an additional primary selector means and additional primary switch operated by that selector means are provided; wherein each primary selector means includes a rod which shifts axially as the selector means is shifted to its switch actuating position; and wherein the release means includes a tube having apertures for receiving the rods when the primary selector means are moved to their switch actuating position, shiftable elements within the tube for blocking both the apertures or either one of them, and a restraining member connected with the latching means for holding the elements in the tube such that they block both apertures when the latching means is in its non-latching position and for permitting limited shifting movement of the elements to allow only one of the rods to enter the tube when the latching means is in its latching position, whereby both of the primary selector means may not be moved into their switch actuating position at the same time.

7. A mechanism according to claim 1 wherein each selector means comprises a rod which shifts axially as the selector means is moved to its switch-actuating position; and wherein the latching means comprises a pivotally mounted plate moveable between non-latching and latching positions, and elements on the plate for engaging and holding the rods when the plate is in its latching position.

8. A mechanism according to claim 6 wherein the latching means comprises a pivotally mounted plate moveable between the non-latching and latching positions, and elements on the plate for engaging and holding the rods when the plate is in its latching position; and wherein the restraining member is connected to and moveable with the plate.

9. A mechanism according to claim 5 wherein the shiftable element in the tube operates a switch when it is shifted by the entry of the rod into the tube.

10. A selection and control mechanism comprising a primary switch, primary selector means for actuating the primary switch when shifted, a first secondary switch, first secondary selector means for actuating the secondary selector switch when shifted, a second secondary switch, second secondary selector means for actuating the second secondary selector switch when shifted, first connector means attached to the first secondary selector means for shifting the primary selector means to a switch actuating position when the first secondary selector means is shifted to its switch actuating position, second connector means attached to the second secondary selector means for shifting the primary selector means to a switch actuating position when the second secondary selector means is shifted to its switch actuating position, the first and second connector means allowing the primary selector means to shift independently of the first and second secondary selector means and also allowing the first or second secondary selector means to shift independently of each other.

11. A mechanism according to claim 10 wherein the primary selector means includes a rod, and a laterally extending abutment on the rod; wherein each secondary selector means includes a rod; and wherein each connector means comprises a bar mounted rigidly with respect to the rod of the secondary selector means with which it is associated and extending across the abutment of the first selector means so that when either secondary selector means is shifted the primary selector means will also be shifted.

12. A mechanism according to claim 11 wherein the abutment on the rod of the primary selector means has a camming surface which actuates the primary switch, and wherein the rod of each secondary selector means carries a camming surface which actuates the secondary switch associated with that selector means.

13. A vending machine having means for brewing a beverage, and one or more means for supplying additives to the beverage, means for controlling the operation of said beverage brewing means and said one or more additives supplying means, said control means including a separate switch for starting operation of each of said beverage brewing means and said additives supply means, said control means including a separate actuator for operating each separate switch and also including a mechanical selection device for controlling the operation of said brewing means and said additive supply means in different combinations, said control means further including an additional switch and an additional actuator for operating the additional switch, said additional switch being connected to one of the additive supply means for causing that additive supply means to dispense a quantity of additive greater than the amount which would normally be dispensed upon the actuation of the separate switch for that additive supply means, whereby the beverage is enriched as to an additive.

References Cited

UNITED STATES PATENTS

| 1,465,384 | 8/1923 | Wescoat | 200—50(C) |
| 2,934,613 | 4/1960 | Stoner et al. | 200—50(C) |
| 2,489,576 | 11/1949 | Henry | 200—50(C) |
| 3,281,544 | 10/1966 | Bailey et al. | 200—50(C) |

STANLEY H. TOLLBERG, Primary Exmainer

U.S. Cl. X.R.

200—50(C)